United States Patent [19]

Reinmold et al.

[11] Patent Number: 4,633,408
[45] Date of Patent: Dec. 30, 1986

[54] PROGRAM-CONTROLLED EDGE GRINDING MACHINE FOR GLASS PANES WITH A PROGRAM-CONTROLLED ROTATABLE GRINDING HEAD

[75] Inventors: Heinz-Josef Reinmold; Horst Mucha, both of Aachen; Heinz-Dieter Friedrich, Stolberg, all of Fed. Rep. of Germany

[73] Assignee: Saint Gobain Vitrage, Aubervilliers, France

[21] Appl. No.: 569,155

[22] Filed: Jan. 9, 1984

[30] Foreign Application Priority Data

Jan. 15, 1983 [DE] Fed. Rep. of Germany ....... 3301170

[51] Int. Cl.$^4$ .............................................. B24B 9/10
[52] U.S. Cl. .................................. 364/474; 51/283 E
[58] Field of Search ................. 364/473, 474; 33/1 M, 33/125 M; 51/283 R, 283 EX, 101 R, 2 B, 2 AA

[56] References Cited

U.S. PATENT DOCUMENTS

| | | | |
|---|---|---|---|
| 4,228,617 | 10/1980 | Bando | 51/283 E |
| 4,325,188 | 4/1982 | Reinmold et al. | 51/283 E |
| 4,375,738 | 3/1983 | Bando | 51/3 |
| 4,422,149 | 12/1983 | Reinmold et al. | 364/473 |
| 4,519,167 | 5/1985 | Halberschmidt | 51/283 E |

FOREIGN PATENT DOCUMENTS 2856519 5/1979 Fed. Rep. of Germany .
2850127 4/1980 Fed. Rep. of Germany .

Primary Examiner—Jerry Smith
Assistant Examiner—Allen MacDonald
Attorney, Agent, or Firm—Pennie & Edmonds

[57] ABSTRACT

A grinding apparatus for glass panes includes a slide and a grinding head with a grinding tool mounted on the slide. The grinding head is capable of rotation through 360° during movement of the slide by an X-Y path control. A motor drives the grinding head under control of control signals derived directly during the grinding process from signals taken from the information carrier determining the X-Y path control of the slide.

12 Claims, 4 Drawing Figures

PROGRAM-CONTROLLED EDGE GRINDING MACHINE FOR GLASS PANES WITH A PROGRAM-CONTROLLED ROTATABLE GRINDING HEAD

TECHNICAL FIELD

The invention relates to a programmed controlled edge grinding apparatus for glass panes. The apparatus provides path control in an X-Y coordinate system for a slide which carries a rotatable grinding head. The rotatable grinding head is capable of rotation through a full 360° turn during a course of grinding the edge of a glass pane, and the angular position of the grinding head is controlled by a program-controlled motor.

BACKGROUND OF THE INVENTION

Under certain circumstances, as may be well known, it is typical to impart rotation to a grinding head during a course of grinding the edges of a glass pane. Thus, the grinding head may be rotated when the grinding tool is to act radially upon the edges of the glass pane with a certain value of contact pressure along predetermined sections of the contour. As circumstances develop and there is a change of the diameter of the grinding disc resulting from wear the contact pressure oftentimes is compensated by readjustment of the grinding tool within the grinding head. To accomplish this end, the grinding tool should be mounted to undergo movement in one direction relative to the grinding head.

German Offenlegungsschrift No. 28 56 519 which corresponds to U.S. Pat. No. 4,228,617 to Shigeru Bando describes an edge grinding apparatus having a grinding head and a motor for driving the grinding head which is responsive to control signals stored on an information carrier. This type of apparatus and operative method calls for a corresponding programming arrangement and/or corresponding programming measures in the setting up of the stored program. Moreover, it is a prerequisite in such operative methods that the information carrier contain space for additional control signals for the motor driving the grinding head.

SUMMARY OF THE INVENTION

The invention according to an important aspect is directed toward the simplification of program control of an apparatus for grinding the edges of a glass pane. The invention seeks to provide an apparatus and a control which excludes possible sources of error thereby to render the overall operation more economical.

The apparatus and method is distinguished from the aforementioned reference by the fact that the control signals for the motor for driving the grinding head are derived from signals representing movement or path control of a slide within an X-Y coordinate system. Control signals as may be stored on an information carrier for control of the slide contain no direct control signals for the grinding head drive motor. As may be appreciated, in setting up a control program, no arrangement and/or operational step is required in the determination of the control signals for driving the motor. Thus, the programming process is vastly simplified and possible sources of mistake are eliminated. The control signals for the drive motor are determined during the grinding process itself as the slide, through a direct control by X- and Y- drive motors, moves within the coordinate system.

The rotary angle of the grinding head at any time within the period of from $t_1$ to $t_2$ may be calculated. The rotary angle may be calculated according to the following relationship $$\omega(t_2 - t_1) = \arctan \frac{\Delta V_Y}{\Delta V_X}$$

wherein $\Delta V$ ($\Delta V_x, \Delta V_y$) is the change of speed of the movement of the grinding tool in the X- and in the Y-directions between the points of time $t_2$ and $t_1$.

According to the invention, the calculation is not taken into consideration while setting up the program. The calculation, rather, takes place during operation of the apparatus at the moment at which the grinding tool experiences a change in speed. The control signals for the drive motor which result may be considered as deriving synchronously with the changes in speed. These control signals provide direct control for the drive motor.

The calculating process may be carried out with the aid of a calculation based upon digitized control signals representative of the X- and Y- coordinates of the slide. A period of time will be required for the calculation, depending upon the type of calculator used for the purpose. The system operation must be relatively slow for this type of calculating process and, therefore, the system operation is more or less suitable only for grinding apparatus having a grinding head with correspondingly slow rotation.

According to an important aspect of the invention, the determination of the required rotary angle is carried out in accordance with an analog calculating system with the assistance of apparatus disposed on the grinding apparatus, itself. Essential components of the analog computer are rotary instruments with sine-cosine characteristics. For example, the rotary instruments may be sine-cosine rotary potentiometers or inductive function rotary generators having rotary axes connected mechanically at a ratio of 1:1 with the rotary axis of the grinding head. Further, the rotary instruments are to be driven by analog voltages which correspond to the speed of the slide in the X- and Y- directions. Actually, a differential voltage obtained from the rotary instruments comprises the direct control for an amplifier or servoamplifier of the drive motor for the grinding head.

Other important features and advantages of the invention will appear as the description, to be read in conjunction with a view of the drawing, continues.

BEST MODE FOR CARRYING OUT THE INVENTION

The invention has an application of use with grinding machines or apparatus having a slide controlled in movement to any position within a two-dimensional plane in grinding the edge of a glass pane.

Figure 1:
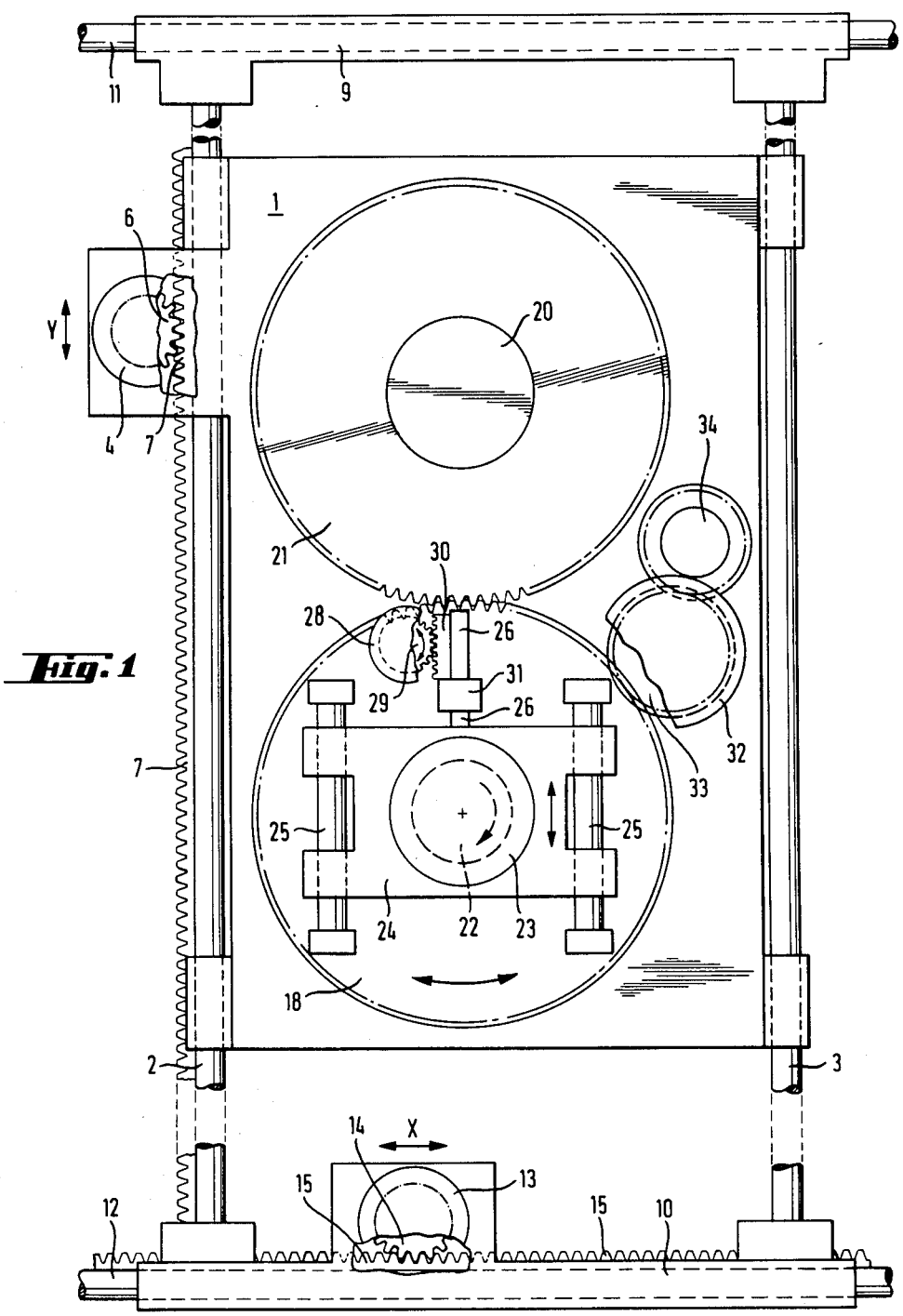
FIG. 1 is a schematic plan view of a slide which carries a grinding head and structure for support and movement of the slide to positions within a two-dimensional plane.

Referring to FIG. 1, a slide 1 is illustrated in a mounted position for movement within a two-dimensional plane along the X- and Y- axes to positions within the coordinate system as determined by an input to a drive for imparting movement in each direction. Thus, the slide may translate along each of the axes and in a compound direction of movement. Particularly, a pair of rails 2, 3 mount the slide for movement along the Y-axis; and a pair of rails 11, 12 mount the slide for movement along the X-axis. These individual movements of the slide, as well as the movements to any coordinate having both X and Y values, are controlled by either one or both of a pair of motors 4, 13. To this end, motor 4 drives slide 1 in the Y-direction, motor 13 drives the slide in the X-direction and the joint operation of both motors results in movement of the slide to other positions.

A plurality of members in the form of individual collars extend from the ends of opposite sides of the slide 1. The collars support the slide for movement along rails 2, 3. A pair of guides 9, 10 in the form of elongated collars support rails 2, 3 for movement of slide 1 along rails 11, 12. A boss or similar structure extends from each guide, within the region of the opposite ends, and the bosses provide a support for the opposite ends of rails 2, 3. The rails 2, 3 and rails 11, 12 along which slide 1 may move are arranged in parallel pairs of rails.

As may be seen in FIG. 1, a bar 7 is carried by rail 2 and a bar 15 is carried by rail 12. The collars which support slide 1 for movement along rail 2, and both the guide 10 and bosses may be slotted or otherwise formed or arranged to accommodate the respective bars which extend from a base at the rails. The extending portion of each bar is defined by a series of teeth along substantially the full length of each bar.

Each motor 4, 13 is mounted on a plate. For example, motor 4 may be carried by a plate which extends from slide 1 and motor 13 may be carried by a plate which extends from guide 10. The plates extend from the structure in a manner which does not interfere with the rails 7, 15 and each motor includes an output member in the form of a pinion 6, 14 for driving engagement with bars 7, 15, respectively. Thus, motor 4 drives slide 1 along the Y-axis and motor 13 drives the slide along the X-axis.

The mounting and drive of slide 1, and the manner of control of movement of the slide within the X-Y coordinate system are of interest in the overall discussion of the invention. To this end, motors 4, 13 may be controlled according to a program control and known methods. For example, the motors may be controlled in accordance with a path program set out on a magnetic tape. The path program may be recorded on the magnetic tape on the basis of a line pattern particularly identified in German Pat. No. 28 50 127 which corresponds to U.S. Pat. No. 4,325,188 to Heinz Josef Reinmold et al. The invention, on the other hand, is particularly directed to the control of rotary movement of the grinding head 18.

A grinding head 18 is mounted on slide 1, and rotary movement is imparted by a motor 20, through a gear 21 at the output of the motor. The grinding head 18 is partially defined by a gear in the form of a rotatable carrier plate and rotary movement is transmitted to the gear at a ratio of 1:1. The motor 20 is likewise supported on slide 1, as may be seen in FIG. 1.

With continued reference to FIG. 1, a mount 24 in the form of a slide is carried by the rotatable carrier plate. The slide, through movement, as will be discussed, provides for regulation of the grinding pressure exerted by a grinding tool or disc 22 on the edge of a glass pane (not shown). The grinding disc is carried by the slide. A motor 23 is also carried by the slide for driving the grinding disc.

Slide 24 is mounted in a manner similar to the mounting of slide 1. To this end, a pair of rails 25 serving as gliding rails are carried by the rotatable carrier plate. The rails are arranged as a parallel family, and a plurality of extensions, such as the extending collars heretofore described, serve to mount slide 24 for movement. This form of mounting permits movement of the slide in directions, as illustrated by the double ended arrow.

A bar 26 is supported by the rotatable carrier plate in position to abut the slide 24. The bar extends longitudinally in the direction of movement of the slide. A motor 28 which may be a torque motor, acting through an output pinion 29 and a toothed rack 30 carried by bar 26 controls the positional disposition of the slide. Positioning of the slide is controlled by movement of the bar. A measuring box 31 responsive to movement of bar 26 under control of motor 28 measures the grinding pressure exerted by the grinding disc 22.

The rotary axes of two rotary instruments are connected kinematically with grinding head 18. The rotary instruments are illustrated in FIG. 1 as a constructional unit 32 and a gearing 33 provides the kinematic connection with the grinding head. The gearing assures that the rotary pickup of the rotary instruments is coupled with the grinding head. The coupling provides a rotary ratio of 1:1. Therefore, rotation of the grinding head through an angle $\alpha$ causes rotation of the rotary axis of the rotary instruments through the angle $\alpha$, also. A tachomachine 34 is also coupled with the grinding head 18. The tachomachine is coupled by gearing 33 by the same rotary ratio of 1:1. The rotary instruments and the tachomachine serve in the overall control of the motor 20.

The rotary instruments may be a four quadrant rotary potentiometer, identified as Type SCB 50 of the firm Megatron, Munich, West Germany. It is also envisioned that the invention may include an inductive sine-cosine function rotation generator, identified as No. V 23 401 E 0012-B 001 of the firm Siemens.

Figure 2:
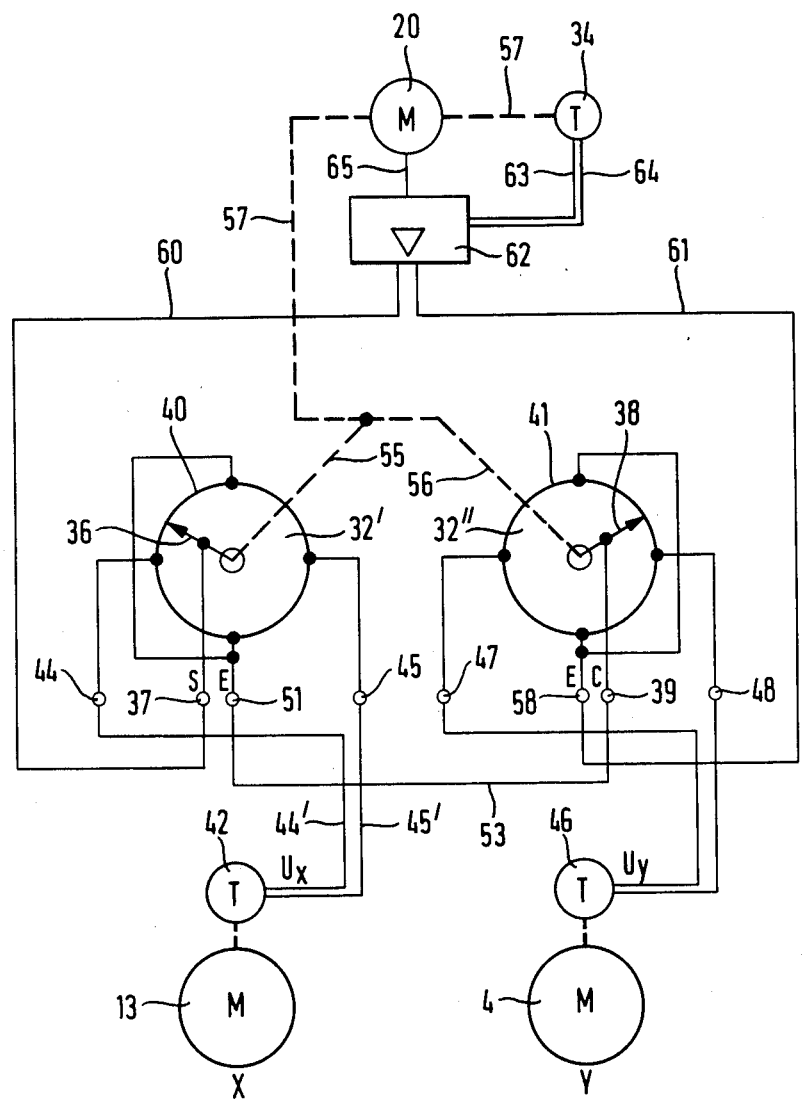
FIG. 2 is a circuit diagram of a control for controlling the rotary angle of the grinding head.

Referring to FIG. 2, there is illustrated a control circuit including sine-cosine potentiometers 32' and 32" (hereafter "potentiometers 32' and 32" ") which may be combined in the practical construction as a double-sine-cosine potentiometer, heretofore referred to as "constructional unit 32". Potentiometers 32' and 32" represent analog computers which develop control signals for motor 20 as determined by the speed of drive of motors 4, 13. Potentiometer 32' is assigned to the X-axis; and potentiometer 32" is assigned to the Y-axis.

A pickup 36 wipes an annular resistance ring 40 of potentiometer 32'; and a pickup 38 wipes an annular resistance ring 41 of potentiometer 32". The annular resistance rings are subdivided into four quadrants so that the resistance characteristic in the individual quadrants display alternately a sine and cosine course. A connecting clamp 51 is connected to two neutral points along the annular resistance ring 40 of potentiometer 32'; and a connecting clamp 58 is connected to two neutral points along the annular resistance ring 41 of potentiometer 32". The connecting clamps 37 and 39 are connected to the pickups 36 and 38, respectively. The connecting clamps 37, 51 of potentiometer 32' are identified in FIG. 2 as "S", "E", respectively and the connecting clamps 39, 58 are identified as "C", "E", respectively.

A tachomachine 42 is connected to motor 13 for the X-axis drive of slide 1. The tachomachine provides an output voltage $U_x$. The output voltage is an analog of the rotary movement of motor 13. As may be seen in FIG. 2, voltage $U_x$ may be found along lines 44', 45' connecting the tachomachine and connecting clamps 44, 45, respectively, of potentiometer 32'. Correspondingly, a tachomachine 46 is connected to motor 4 for the Y-axis drive of slide 1. The tachomachine provides an output voltage $U_y$. The output voltage is an analog of the rotary movement of motor 4. With continued reference to FIG. 2, the voltage $U_y$ is found along the lines connecting the connecting clamps 47, 48 of potentiometer 32" to the tachomachine.

Potentiometers 32' and 32" are series connected. Particularly, the connecting clamp 51, connected to the neutral points along the annular ring resistance 40, is connected to the connecting clamp 39 which, in turn, is connected to pickup 38. The connection is completed by line 53. The rotary axes 55, 56 of potentiometers 32', 32", respectively, are, in turn, connected to rotary axis 57 of motor 20. The connection provides a rotary ratio of 1:1.

FIG. 2 illustrates the coupling of tachomachine 34 and motor 20. As previously indicated, the coupling through the rotary axis 57 provides a rotary ratio of 1:1 between the motor and tachomachine, as well.

A differential voltage may be obtained from the series connected potentiometers 32' and 32". The differential voltage may be tapped at the connecting clamps 37, 58. The former connecting clamp provides a voltage tap determined by the angular position of pickup 36 of potentiometer 32', while the latter connecting clamp provides a voltage tap at the neutral points of potentiometer 32". The differential voltage which serves as a theoretical value voltage serves as a voltage input to amplifier 62. The amplifier is a four quadrant servoamplifier and lines 60, 61 connect the amplifier and connecting clamps 37, 58. The amplifier 62 has a second input comprising an actual value voltage. The actual value voltage comprises the output of tachomachine 34 coupled to motor 20 which is connected to the amplifier along lines 63, 64. Amplifier 62, then, provides a control output connected to motor 20 along line 65.

The differential voltage or theoretical value voltage may range between a positive value and zero. Referring to the mathematical relationship $$U_x \cdot \sin\omega(t_2 - t_1) = U_y \cdot \cos\omega(t_2 - t_1)$$

where $U_x$ corresponds to the tachovoltage of the X-axis and $U_y$ corresponds to the tachovoltage of the Y-axis, when the above relationship is fulfilled and the theoretical value voltage is zero. The motor 20, the grinding head 18 driven by the motor and the potentiometers 32' and 32" coupled with the motor rotate under control of the amplifier 62 during a period of time until the mathematical relationship is fulfilled and the differential or theoretical value voltage becomes zero. In this manner, the mathematical relationship between the changes of speed in both the X-direction and Y-direction, and the rotary angle will be fulfilled.

Referring again to FIG. 1, it will be seen that rotation of the grinding head results in a capability of regulation of the grinding pressure exerted by the grinding disc 22. More particularly, the regulation of grinding pressure is a function of torque motor 28. A regulating circuit is illustrated schematically in FIG. 3.

Figure 3:
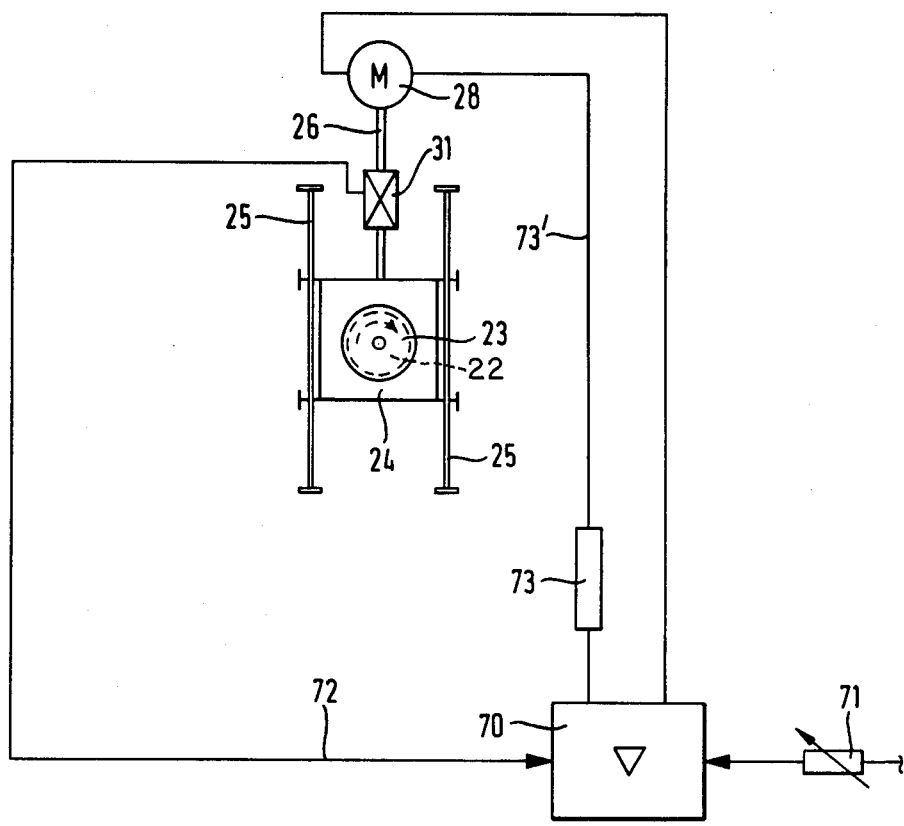
FIG. 3 is a circuit diagram of a control for regulating the pressure of the grinding head exerted on an edge of a glass pane.

Referring now to FIG. 3, there is a representative showing of slide 24 mounted for linear movement along rails 25, bar 26 movable under control of torque motor 28 to move the slide for regulation of grinding pressure exerted by the grinding disc 22 driven by motor 23 and the measuring box 31 responsive to movement of the bar.

An amplifier 70 which is a servoamplifier is connected to the output of measuring box 31, representing an actual value of contact pressure, and a potentiometer 71 having adjustment capability. A line 72 provides the connection with the measuring box. The potentiometer 71 is connected to a voltage comprising a theoretical value for contact pressure. Thus, the actual value for contact pressure and the theoretical value together are compared and amplifier 70 drives torque motor 28 with a comparison voltage. A line 73' connects the output of amplifier 70 and the input of torque motor 28. A replacement resistor 73 is located in the line 73' between the amplifier and torque motor. The resistor is used since there is no motor "emf".

It is possible to vary the grinding pressure during rotation of the rotatable carrier plate around the glass pane. In fact, a change in grinding pressure may be recommended when grinding the corner edges of an angular glass. To this end, the grinding pressure appropriately may be reduced from a first level at a corner and during travel around the corner. Once around the corner, the grinding pressure may be raised to the first level during travel along a linear or substantially linear edge path toward another corner. The grinding pressure may be changed in accordance with a predetermined program as the grinding head moves around the glass pane. A change in grinding pressure may be accomplished by changing the theoretical values of the grinding pressure. These changes may follow a predetermined program instead of a fixedly adjusted predetermination of the theoretical values as may occur in the regulation of the grinding pressure with adjustment of potentiometer 71.

Figure 4:
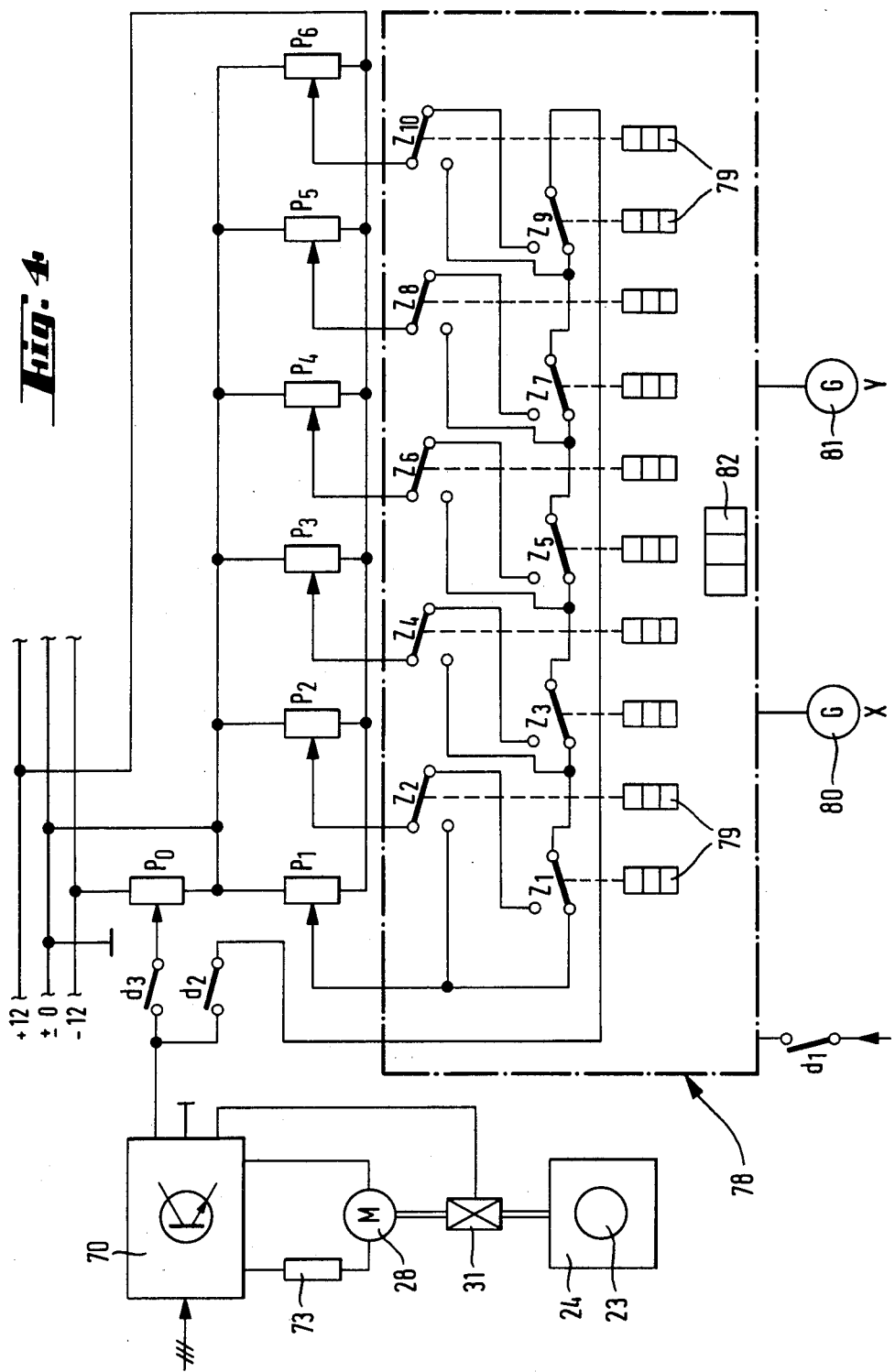
FIG. 4 is a circuit diagram of a system which may be programmed in the regulation of a grinding pressure exerted throughout a complete movement of the grinding head circumferentially around the glass pane.

Reference now may be had to the circuit diagram of FIG. 4 illustrating a system for accomplishing a program-controlled regulation of a grinding pressure exerted throughout a complete movement of grinding head 18 along the edge of glass pane 12. Particularly, and as previously discussed, the regulation under consideration is that of regulating the pressure exerted by the grinding disc carried by slide 24 as the slide and glass pane move relative to one another in the all-around grinding of the edge of the glass pane. The grinding pressure of the grinding disc may be changed by a regulating circuit as the grinding disc moves along the edge. To this end, the regulating circuit functions to reduce the grinding pressure during movement of the grinding disc around an acutely angled corner section of the glass pane and to increase the grinding pressure as the grinding disc moves from the region of the corner section to a region along which the edge is a straight line or substantially straight line section. The regulating circuit, rather than functioning on the basis of a firmly adjusted predetermined theoretical value, functions on the basis of variable preset theoretical values in dependence on the actual position of the grinding disc.

The regulation system in the all-around programming includes a counter 78 illustrated schematically within the dot-dash line in FIG. 4. The counter may be commercial digital counter with forward characteristic.

The counter 78 includes a plurality of pre-selection switches 79. Specifically, the counter includes ten pre-selection switches, each of which controls a relay and, in turn, a relay switch whose individual contacts are designated $Z_1$ to $Z_{10}$. The control is represented by the dash line in the Figure.

The pre-selection switches 79 of counter 78 determine the points along the path of movement of the grinding disc at which the grinding pressure is to be decreased and then increased, again, for reasons as previously discussed. The several points along the path of movement are effectively found or fixed empirically.

A pair of digital time generators 80, 81 pre-time the counter 78. The digital time generator 80 is coupled with the drive for the X-axis, and the digital time generator 81 is coupled to the drive for the Y-axis. Each time signal of one or the other of the digital time generators is cycled forward and the number of strokes is displayed on a field indicator 82. When a count adjusted on a pre-selection switch 79 agrees with the number of strokes displayed on the field, the relay controlled by that pre-selection switch becomes energized to control the relay switch $Z_1$ to $Z_{10}$.

Potentiometer $P_1$ is a theoretical value of grinding pressure potentiometer connected across a +12 volt potential provided by a power source. A tap of potentiometer $P_1$ is connected in series through relay contact $Z_1$, $Z_3$, $Z_5$, $Z_7$ and $Z_9$, in the position shown in FIG. 4, to a contact $d_2$. The tap of the potentiometer is also connected to an open terminal of relay contact $Z_2$. The potentiometer $P_1$ determines the basic grinding pressure which is the grinding pressure to be exerted by the grinding disc along a straight line edge of the glass pane as the slide 1 and grinding head 18 move under control of the X- and Y- drive motors.

Potentiometers $P_2$, $P_3$, $P_4$, $P_5$ and $P_6$, likewise, are theoretical value grinding pressure potentiometers. These potentiometers determine the grinding pressure as desired at the several straight line edges of the glass pane. To this end, the potentiometer $P_2$ will determine the grinding pressure as desired at the first of the several corners, the potentiometer $P_3$ will determine the grinding pressure as desired at the second of the corners, and so on throughout the all-around relative movement of the slide and glass pane in the completed edge grinding of the glass pane.

The potentiometers $P_2$, $P_3$, ... $P_6$ are also connected across a +12 volt potential and assigned, respectively, to relay contacts $Z_2$, $Z_4$, $Z_6$, $Z_8$ and $Z_{10}$. The potentiometer $P_0$ serves for the purpose of removing or eliminating the grinding pressure after completion of the grinding process. Typically, this action may be carried out by retraction of the slide 1 and grinding head to an at rest position. The potentiometer $P_0$ is connected across a −12 volt potential provided by the power source.

The operation of the system for accomplishing a program-controlled regulation of grinding pressure may be appreciated with the following description, to be considered with the schematic illustration of FIG. 4.

At a start signal, for commencing operation of the grinding machine, the digital time generators 80, 81 are put into rotation in correspondence to a predetermined path of movement to be taken by slide 1. The digital time generators pre-time the digital counter 78. The start signal is developed upon closure of a start signal contact (not shown).

As previously indicated, each pre-selection switch 79 controls an individual one of the relays and its relay contacts $Z_1$, $Z_2$, ... $Z_{10}$. Specifically, the appropriate relay contacts will be controlled to switch the potentiometer $P_1$ into and out of the grinding pressure control system in a sequence of operation which includes operation one after another of potentiometers $P_2$, $P_3$, ... $P_6$. The potentiometer $P_1$ determines the basic grinding pressure along straight line paths, and the potentiometers $P_2$, $P_3$, ... $P_6$ determine the level of decrease in grinding pressure to be exerted by the grinding disc along a circular line path. When the grinding disc returns to the straight line path from a circular line path, the potentiometer $P_1$, again, is operative to increase the grinding pressure to the level of the basic grinding pressure.

At the time that the start signal is given the slide and grinding head will be located along a straight line path and the potentiometer $P_1$ will set the theoretical value of grinding pressure (the basic grinding pressure).

Time signals from the digital time generators, coupled to the X- and Y- drive motors, are cycled forward and the number of strokes are displayed on a field indicator 82. When the count adjusted on the pre-selection switch 79 which controls relay contacts $Z_1$ is equal to the display then relay contact $Z_1$ is operated to open the series connection between the tap of potentiometer $P_1$ and contact $d_2$. The series connection will, however, be completed between the tap of potentiometer $P_2$ and relay contacts $Z_2$ and $Z_1$.

As slide 1 continues movement, the number of strokes displayed on field indicator 82 will equal the count adjusted on the pre-selection switch 79 which controls relay contacts $Z_2$. This relay contact, then, will switch to open the series connection between the tap of potentiometer $P_2$ and contact $d_2$. The series connection, then, will be completed for the second time through the tap of potentiometer $P_1$ and the relay contacts $Z_2$ and $Z_1$.

According to the stated operation a basic grinding pressure for a straight line path is set by potentiometer $P_1$, a decrease in grinding pressure for a curved line path is set by potentiometer $P_2$, the basic grinding pressure (increased from the level of the decrease) for the next straight line path is reset by potentiometer $P_1$, and the sequence continues by operation of relay contacts $Z_3$, $Z_4$, ... $Z_{10}$ as the adjusted count on the proper pre-selection switch equals the count on field indicator 82.

When relay contact $Z_{10}$, or the last of the relay contacts to be controlled by a pre-selection switch 79, determined by the number of straight and curve line paths along the edge of the glass pane, is controlled to open the series connection between the tap of potentiometer $P_6$ and contact $d_2$, all of the potentiometers $P_1$, ... $P_6$ will have been switched from the series connection.

The contact $d_2$ is closed by the start signal through the start signal contact, and the contact remains closed during the full sequencing operation following the switching of relay contacts $Z_1, Z_2, \ldots Z_{10}$. When all of the potentiometers $P_1, P_2, \ldots P_6$ are switched from the series connection, indicative of the fact that the slide has travelled around the edge of the glass pane, the contact $d_2$ opens and contact $d_3$ closes. As previously indicated, the theoretical value signal of potentiometer $P_0$, through contact $d_3$, controls the amplifier 70 to return slide 1 and slide 24 to the start position. The contact $d_1$ provides an erase signal for emptying the storage of the counter 78. The contact $d_1$ operates simultaneously with the operation of contacts $d_2$ and $d_3$.

FIG. 4 illustrates a counter with a plurality of ten pre-selection switches 79. The illustration is for purposes of discussion of the operation of the counter only, and it should be apparent that any number of pre-selection switches may be used to control the grinding disc. Further, it is possible to store the theoretical values for grinding pressure control at the various path locations determined by the shape of the glass pane on a data carrier. For example, the data carrier may comprise a magnetic tape containing path information for the control of the driving motors for the slide 1, and the theoretical values, also carried by the magnetic tape may be transferred automatically to the pre-selection switches 79, and the potentiometers $P_1$ to $P_6$. Thus, the data carrier may store all data required for the grinding of a certain model of glass pane.

We claim:

1. A grinding apparatus for grinding the edge of a glass pane including a slide movement through input control of an information carrier in an X-Y coordinate system, a grinding tool, a grinding head, a mount for mounting said grinding tool on said slide adapted for movement with said grinding tool in opposite longitudinal directions, said apparatus characterized by a motor for driving said grinding head through a 360° turn during the course around said glass pane to maintain the axis of movement of said mount and grinding tool in a constant fixed position relative substantially to each increment of an edge of said glass pane as said grinding tool grinds said edge, and means providing an output signal for controlling said motor and the angular position of said grinding head, said output signal of said controlling means being responsive to and derived from signals taken from said information carrier for path control of said slide in said X-Y coordinate system.

2. The apparatus of claim 1 further characterized by microprocessor means, and wherein said output signal of said controlling means derives from digitalized control signals from said microprocessor means for control of a pair of motors for driving said slide in said X-Y coordinate system.

3. The apparatus of claim 1 wherein said controlling means is characterized by analog computer means, and converter means providing voltage signals analogous to the speed of movement of said slide in said X-Y coordinate system, and wherein said output signal of said controlling means is a derivation of said voltage signals.

4. The apparatus of claim 3 which further includes a first converter responsive to the speed of movement of said slide in the X-direction and a second converter responsive to the speed of movement of said slide in the Y-direction, each said converter comprising a tachomachine coupled to the rotational axis of a respective drive motor for driving said slide in said coordinate system.

5. A grinding apparatus for grinding the edge of a glass pane including a slide movable through input control of an information carrier in an X-Y coordinate system, a grinding tool and a grinding head mounting said grinding tool on said slide, said apparatus characterized by a motor for driving said grinding head through a 360° turn during the course around said glass pane as said grinding tool grinds said edge, controlling means providing an output signal for controlling said motor and the angular position of said grinding head, said output signal of said controlling means responsive to and derived from signals taken from said information carrier for path control of said slide in said X-Y coordinate system, said controlling means characterized by analog computer means comprising two rotary instruments each having sine-cosine characteristics, each rotary instrument having a rotational axis coupled to a rotational axis of said motor and being series connected for providing a differential voltage output, said differential voltage output comprising a theoretical value voltage, converter means providing voltage signals analogous to the speed of movement of said slide in said X-Y coordinate system, wherein said output signal of said controlling means is a derivation of said voltage signals, and said apparatus further comprising an amplifier responsive to said differential voltage output for driving said motor.

6. The apparatus of claim 5 wherein said rotary instruments are rotary potentiometers.

7. The apparatus of claim 6 wherein said rotary potentiometers are four-quadrant instruments, and said controlling means is a four-quadrant servoamplifier.

8. The apparatus of claim 5 wherein said rotary instruments are inductive function rotary generators.

9. The apparatus of claim 8 wherein said inductive function rotary generators are four-quadrant instruments, and said controlling means is a four-quadrant servoamplifier.

10. A grinding apparatus for grinding the edge of a glass pane including a slide movable through input control of an information carrier in an X-Y coordinate system, a grinding tool and a grinding head mounting said grinding tool on said slide, said apparatus characterized by a motor for driving said grinding head through a 360° turn during the course around said glass pane as said grinding tool grinds said edge, means providing an output signal for controlling said motor and the angular position of said grinding head, said output signal of said controlling means being responsive to and derived from signals taken from said information carrier for path control of said slide in said X-Y coordinate system, a mount supported on said grinding head for mounting said grinding tool for movement linearly of said slide, a torque motor having an output for adjusting the grinding pressure exerted by said grinding tool on said glass pane, and means connecting said mount and output of said torque motor.

11. The apparatus of claim 10 wherein said connecting means includes a pressure measuring box, and further including a signal source connected to said pressure measuring box providing a starting signal for operation of said torque motors.

12. The apparatus of claim 11 including a digital counter, said digital counter connected to said signal source for periodic adjustment of said grinding pressure exerted by said grinding tool during the entire course of travel of said grinding tool around said glass pane.

* * * * *